US008775879B2

(12) United States Patent
Oh et al.

(10) Patent No.: US 8,775,879 B2
(45) Date of Patent: Jul. 8, 2014

(54) METHOD AND APPARATUS FOR TRANSMITTING DATA BETWEEN TIMING CONTROLLER AND SOURCE DRIVER, HAVING BIT ERROR RATE TEST FUNCTION

(75) Inventors: Kwang Il Oh, Daejeon-si (KR); Yun Tack Han, Anyang-si (KR); Soo Woo Kim, Daejeon-si (KR); Jung Hwan Choi, Daejeon-si (KR); Hyun Kyu Jeon, Daejeon-si (KR); Joon Ho Na, Daejeon-si (KR)

(73) Assignee: Silicon Works Co., Ltd., Daejeon-Si (KR)

( * ) Notice: Subject to any disclaimer, the term of this patent is extended or adjusted under 35 U.S.C. 154(b) by 195 days.

(21) Appl. No.: 13/333,240

(22) Filed: Dec. 21, 2011

(65) Prior Publication Data

US 2012/0166896 A1 Jun. 28, 2012

(30) Foreign Application Priority Data

Dec. 28, 2010 (KR) ........................ 10-2010-0136800

(51) Int. Cl.
*G06F 11/00* (2006.01)

(52) U.S. Cl.
USPC .......................................................... 714/704

(58) Field of Classification Search
USPC .......................................................... 714/704
See application file for complete search history.

(56) References Cited

U.S. PATENT DOCUMENTS

| | | | | |
|---|---|---|---|---|
| 5,726,991 | A * | 3/1998 | Chen et al. | 714/704 |
| 6,873,939 | B1 | 3/2005 | Zerbe et al. | |
| 7,219,113 | B2 * | 5/2007 | Bonaccio et al. | 708/250 |
| 2005/0071399 | A1 | 3/2005 | Bonaccio et al. | |
| 2007/0011534 | A1 | 1/2007 | Boudon et al. | |
| 2011/0022743 | A1 * | 1/2011 | Liu | 710/36 |

FOREIGN PATENT DOCUMENTS

| | | |
|---|---|---|
| CN | 101593481 | 12/2009 |
| CN | 101853624 | 10/2010 |
| EP | 1 091 518 | 4/2001 |
| JP | 5-83330 | 4/1993 |
| JP | 6-209355 | 7/1994 |
| KR | 10-2006-0117715 | 11/2006 |
| WO | 2010/047484 | 4/2010 |

* cited by examiner

*Primary Examiner* — Sam Rizk
(74) *Attorney, Agent, or Firm* — Kile Park Reed & Houtteman PLLC

(57) ABSTRACT

Embodiments of the present invention provide a method and apparatus for transmitting data between a timing controller and a source driver. In some embodiments, the method includes a bit error rate test (BERT) function for sensing an error rate in real time when data is transmitted and received between the timing controller and the source driver.

15 Claims, 5 Drawing Sheets

METHOD AND APPARATUS FOR TRANSMITTING DATA BETWEEN TIMING CONTROLLER AND SOURCE DRIVER, HAVING BIT ERROR RATE TEST FUNCTION

BACKGROUND OF THE INVENTION

1. Field of the Invention

The present invention relates to a method and apparatus for transmitting data between a timing controller and a source driver, and more particularly, to a data transmission method and apparatus between a timing controller and a source driver, which has a bit error rate test (BERT) function for sensing an error rate in real time when data is transmitted/received between the timing controller and the source driver.

2. Description of the Related Art

Flat panel display devices are used in various fields because the flat panel displays are more thin and lighter than the conventional cathode ray tubes (CRTs). Specifically, display devices, such as liquid crystal displays (LCD), plasma display panels (PDP), and organic light emitting diodes (OLED), are rapidly spreading in the market while substituting for the conventional CRTs.

A flat panel display device receives a data signal from an external host system and applies the data signal to a display panel, thereby displaying an image. In this case, the flat panel display device includes a timing controller and a source driver.

That is to say, a data signal applied from an external host system is inputted to the timing controller, and the timing controller reprocesses and transmits the inputted data signal to the source driver. The source driver applies an image data voltage to the display panel using the data signal received from the timing controller.

Recently, as flat panel display devices increase in size and it is necessary to provide high quality of image, the resolution has shown a tendency to be higher. Accordingly, for data transmission between a timing controller and a source driver, a signal quality and transmission rate higher than those in the prior art is required, and a low EMI level is required for reliability of a display system.

Display devices using Reduced Swing Differential Signaling (RSDS) and mini-Low Voltage Differential Signaling (LVDS), which are conventional data transmission standards, a signal line structure in a multi-drop bus scheme is used. The RSDS scheme causes a structural impedance mismatching problem, so that signal quality decreases rapidly as a transmission rate increase, and simultaneously the EMI level becomes higher.

In order to compensate for such a problem, a Point-to-Point Differential Signaling (PPDS) technology has been proposed. The technology is to transmit a data signal through a signal line with a point-to-point structure, in which there is hardly any signal mismatching, thereby making it possible to maintain high signal quality even at a high transmission rate. However, when the number of source drivers increases, the number of data and clock signal lines increases at the same rate, thereby complicating the connections of the entire signal lines and causing the cost to increase.

FIG. 1 is a view explaining an example of a conventional protocol for data transmission between a timing controller and a source driver.

As shown in FIG. 1, a conventional protocol for data transmission between a timing controller and a source driver includes step 1 (P-I), step 2 (P-II), and step 3 (P-III) as one cycle. Step 1 corresponds to a clock training step, in which a clock signal CT for synchronizing clocks between the timing controller and the source driver is transmitted. In step 2, a control signal for the operation setup and configuration registration of the source driver is transmitted. In step 3, a data signal (RGB signal) for applying image data to a display panel is transmitted.

FIG. 2 is a view explaining a detailed transmission packet in step 2 of an example of a conventional protocol for data transmission between a timing controller and a source driver.

Referring to FIG. 2, step 2 is a step of transmitting a setup information signal of a source driver, wherein a control start packet "CTR_START packet", control packets "CTR1 packet" and "CTR2 packet", and a data start packet "DATA_START packet" are included. The control start packet indicates that the next packet is a control packet, the control packet carries various control signals for the configuration setup of the source driver, and the data start packet indicates that the next packet is a data packet. In step 2, a preamble packet "PREAMBLE packet" for data synchronization or the like may be included.

Tables 1 and 2 below represent the definitions of bits which are allocated to the control start packet and data start packet, respectively.

TABLE 1

| Bit # | Name | Default |
|---|---|---|
| 0,1 | CK | HH |
| 2-7 | CTR_START BIT | HLHLHL |
| 8-25 | Dummy | — |
| 26,27 | DMY | LL |

TABLE 2

| Bit # | Name | Default |
|---|---|---|
| 0,1 | CK | HH |
| 2-7 | DATA_START BIT | LHLHLH |
| 8-25 | Dummy | — |
| 26,27 | DMY | LL |

Referring to Tables 1 and 2, the control start packet includes control start bits (CTR_START; $2^{nd}$ to $7^{th}$ bits) for indicating that the next packet is a control packet, and reserved bits (Dummy; $8^{th}$ to $25^{th}$ bits); and the data start packet also includes data start bits (DATA_START; $2^{nd}$ to $7^{th}$ bits) for indicating that the next packet is a data packet, and reserved bits (Dummy; $8^{th}$ to $25^{th}$ bits). In addition, each of the control start packet and data start packet includes clock signals "CK" and "DMY" embedded with the same size as a data signal.

As described above, the conventional protocol for data transmission between a timing controller and a source driver does not include a bit error rate test (hereinafter, referred to as "BERT") function, so that there is a difficulty in real-time sensing the bit error rate in a transmission path between the timing controller and the source driver.

SUMMARY OF THE INVENTION

Accordingly, the present invention has been made in an effort to solve the problems occurring in the related art, and an object of the present invention is to provide a method and apparatus for transmitting data between a timing controller and a source driver wherein the method and apparatus additionally comprises a bit error rate test function of sensing the bit error rate in a transmission path between the timing controller and the source driver.

In order to achieve the above object, according to one aspect of the present invention, there is provided a method for transmitting data between a timing controller and a source driver, the method having a bit error rate test function, the method comprising the steps of: (a) transmitting in a normal mode, wherein a clock training step of synchronizing clocks between the timing controller and the source driver, a step of sequentially transmitting a control start packet CTR_START, control packets CTR1 and CTR2, and a data start packet DATA_START for configuration setup of the source driver, and a step of transmitting a data packet RGB DATA are included as one cycle; (b) transmitting in a bit error rate test (BERT) ready mode, wherein logic states of the control start packet and data start packet in the normal mode are changed and transmitted by first and second BERT packets; (c) transmitting in a BERT operation mode, wherein the control packets are disregarded by the first BERT packet in the BERT ready mode, and a pseudo random binary sequence (PRBS) pattern instead of the data packet is transmitted by the second BERT packet; and (d) comparing the pseudo random binary sequence and a bit stream set in the source driver, and sensing a bit error rate.

Here, the method further comprises a step of presenting the bit error rate on a display panel.

Preferably, step (c) of transmitting in the BERT operation mode is performed after step (b) is consecutively repeated one or more times.

In addition, according to another aspect of the present invention, there is provided an apparatus for transmitting data between a timing controller and a source driver, the apparatus having a bit error rate test function, the apparatus comprising: the timing controller which comprises a data processing unit for processing and outputting a data signal inputted from an exterior, a first linear feedback shift register (LFSR) for outputting a first bit stream, a first XOR gate for outputting a pseudo random binary sequence (PRBS) by performing an XOR operation between the first bit stream and a bit stream in which all bits have a value of 1, and a MUX for selecting and outputting one of the pseudo random binary sequence and the data signal to the data signal transmission line; and the source driver which comprises a second linear feedback shift register for outputting a second bit stream, and a second XOR gate for outputting a result of an XOR operation between the second bit stream and the pseudo random binary sequence.

Here, the apparatus further comprises an error counter for performing a counting operation when comparing a pseudo random binary sequence transmitted from the timing controller with a bit stream set in source driver and thus sensing a bit error.

Preferably, the first and second linear feedback shift registers output bit streams each of which is constituted by 24 bits.

BRIEF DESCRIPTION OF THE DRAWINGS

The above objects, and other features and advantages of the present invention will become more apparent after a reading of the following detailed description taken in conjunction with the drawings, in which.

DETAILED DESCRIPTION OF PREFERRED EMBODIMENTS

Figure 1:
Fig.1 (Prior Art)
FIG. 1 is a view explaining an example of a protocol for data transmission between a timing controller and a source driver.
Figure 2:
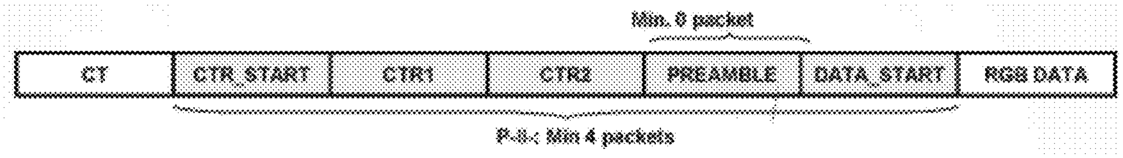
Fig.2 (Prior Art)
FIG. 2 is a view explaining a detailed transmission packet in step 2 of an example of a protocol for data transmission between a timing controller and a source driver.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 3:
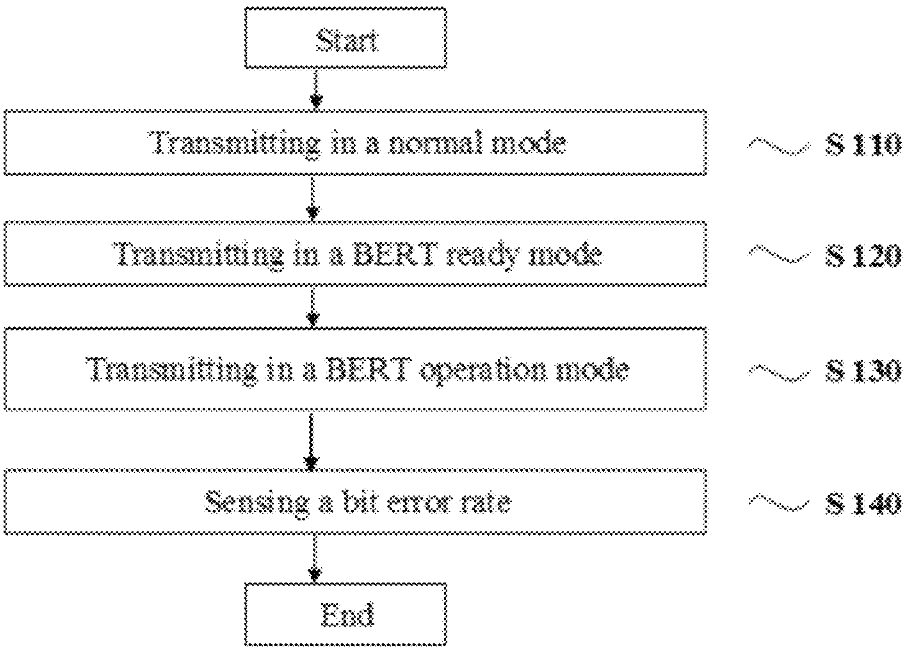
FIG. 3 is a view explaining a data transmission method between a timing controller and a source driver, to which a BERT function is added according to an embodiment of the present invention.

FIG. 3 is a view explaining a data transmission method between a timing controller and a source driver, to which a bit error rate test (BERT) function is added according to an embodiment of the present invention.

Referring to FIG. 3, a data transmission method between a timing controller and a source driver, to which a BERT function is added according to an embodiment of the present invention, includes step S110 of transmitting in a normal mode, step S120 of transmitting in a BERT ready mode, step S130 of transmitting in a BERT operation mode, and step S140 of sensing a bit error rate.

Here, the data transmission method may further include a step of presenting the bit error rate on a display panel.

Step S110 of transmitting in a normal mode includes: a clock training step of synchronizing clocks between the timing controller and the source driver; a step of sequentially transmitting a control start packet "CTR_START packet", control packets "CTR1 packet" and "CTR2 packet", and a data start packet "DATA_START packet" for configuration setup of the source driver; and a step of transmitting a data packet "RGB DATA packet", as one cycle.

Step S110 of transmitting in the normal mode is performed on the basis of an existing protocol for data transmission between the timing controller and the source driver. However, the process is just an exemplary embodiment of the present invention, and those skilled in the art may make various changes in form and details without departing from the scope of the technical aspects of the invention.

In step S120 of transmitting in the BERT ready mode, the logic states of the control start packet and data start packet in the normal mode are changed and transmitted by first and second BERT packets.

In step S130 of transmitting in the BERT operation mode, the control packets "CTR1 packet" and "CTR2 packet" are disregarded by the first BERT packet transmitted in the BERT ready mode, and a pseudo random binary sequence (PRBS) pattern instead of the data packet (i.e. RGB DATA packet) is transmitted by the second BERT packet.

Here, step S130 of transmitting in the BERT operation mode starts when step S120 of transmitting in the BERT ready mode has been consecutively repeated one or more times. Preferably, for assurance of reliability, when step S120 of transmitting in the BERT ready mode has been consecutively repeated at least three times, step S130 of transmitting in the BERT operation mode starts.

Tables 3 and 4 below define the bit configurations of first and second BERT packets, respectively, according to an embodiment of the present invention.

TABLE 3

| Name | Bit Assign | |
|---|---|---|
| CK | 0,1 | HH |
| First BERT BIT | 2-7 | LLLLLL |
| DSRST BIT | 8-10 | XXX |
| DSEN BIT | 11-13 | XXX |
| DMY | 14-25 | — |
| DMY | 26,27 | LL |

TABLE 4

| Name | Bit Assign | |
|---|---|---|
| CK | 0,1 | HH |
| Second BERT BIT | 2-7 | LLLHHH |
| POL | 8-10 | XXX |
| RXC | 11-13 | XXX |
| EQ1,2 | 14-19 | XXX XXX |
| CLR/HLDb | 20-22 | XXX |
| DMY | 23-25 | — |
| DMY | 26,27 | LL |

Referring to Table 3, the first BERT packet changes the logic state of the control start bits ($2^{nd}$ to $7^{th}$ bits), which are "HLHLHL" in the existing control start packet, to "LLLLLL", and utilizes a part of reserved bits ($8^{th}$ to $25^{th}$ bits) as bits for controlling the BERT operation mode. Although the embodiment of the present invention is described regarding the case where the first BERT packet changes the logic state of the control start bits ($2^{nd}$ to $7^{th}$ bits), which are "HLHLHL" in the existing control start packet, to "LLLLLL", the present invention is not limited thereto, and the logic state of the control start bits can be changed to another logic state which can be distinguished from that in the existing control start packet.

The bits for controlling the BERT operation mode include, for example, reset bits "DSRST BIT" for according a PRBS pattern to be transmitted by the timing controller with a bit stream of the source driver, and enable bits "DSEN BIT" for determining the transmission of the PRBS pattern That is to say, when the reset bits have a first logic state, the pseudo random binary sequence and a bit stream set in the source driver accord with each other. When the enable bits have a second local state, the pseudo random binary sequence is transmitted to the source driver in the next cycle, whereas when the enable bits have a third local state, the transmission of the pseudo random binary sequence is held in the next cycle. Preferably, the second logic state and the third logic state have to be able to be distinguished from each other.

For example, the reset bits "DSRST BIT" may configured with three bits, wherein when the logic state thereof is "HHH", a PRBS pattern to be transmitted by the timing controller and a bit stream set in the source driver may accord with each other.

Also, the enable bits "DSEN BIT" may configured with three bits, wherein a PRBS pattern is transmitted in the next cycle when the enable bits has a logic state of "HHH", and the transmission of a PRBS pattern is held in the next cycle when the enable bits has a logic state of "LLL".

Referring to Table 4, the second BERT packet changes the logic state of the data start bits ($2^{nd}$ to $7^{th}$ bits), which are "LHLHLH" in the existing data start packet "DATA_START packet", to "LLLHHH", and utilizes a part of reserved bits ($8^{th}$ to $25^{th}$ bits) as bits "POL", "RXC", "EQ1", "EQ2", and "CLR/HLDb" for setting the configuration of the source driver, instead of a control packet disregarded by the first BERT packet.

Although the embodiment of the present invention is described regarding the case where the second BERT packet changes the logic state of the data start bits ($2^{nd}$ to $7^{th}$ bits), which are "LHLHLH" in the existing data start packet "DATA_START packet", to "LLLHHH", the present invention is not limited thereto, and the logic state of the data start bits can be changed to another logic state which can be distinguished from that in the existing data start packet.

In step S140 of sensing a bit error rate, the PRBS pattern transmitted by the timing controller is compared with the bit stream set in the source driver, so that the error rate of a transmission path is sensed.

According to an embodiment of the present invention, a predetermined rule is set between a PRBS pattern to be transmitted and a bit stream set in the source driver, and then it is checked whether or not the predetermined rule between the PRBS pattern to be transmitted and the bit stream has kept.

In addition, the step of presenting the bit error rate on a display panel makes it possible to identify the bit error rate in real time by presenting the bit error rate on the display panel.

Figure 4:
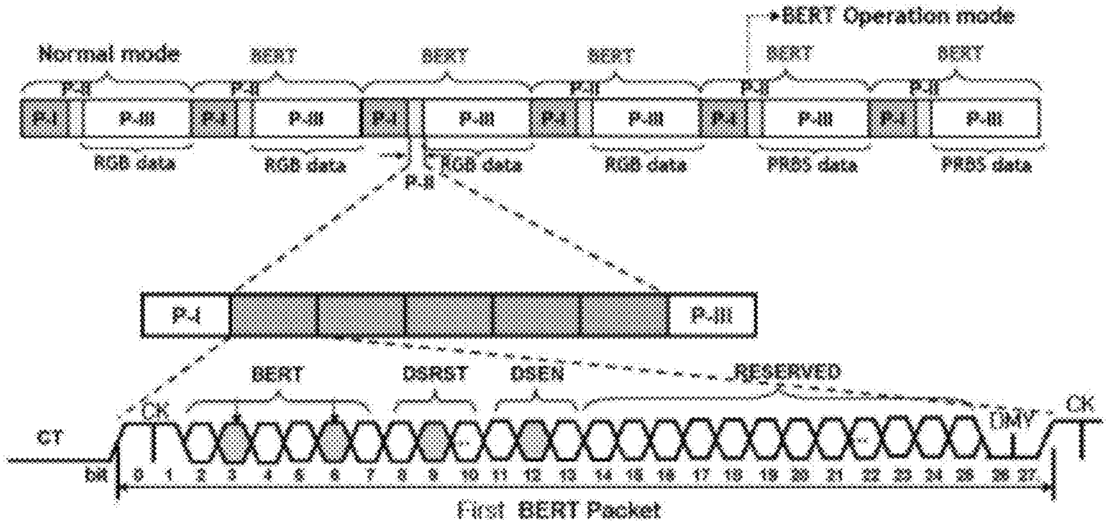
FIGS. 4 and 5 are views explaining the start of the BERT operation mode in the data transmission method between a timing controller and a source driver, to which the BERT function is added according to an embodiment of the present invention.
Figure 5:
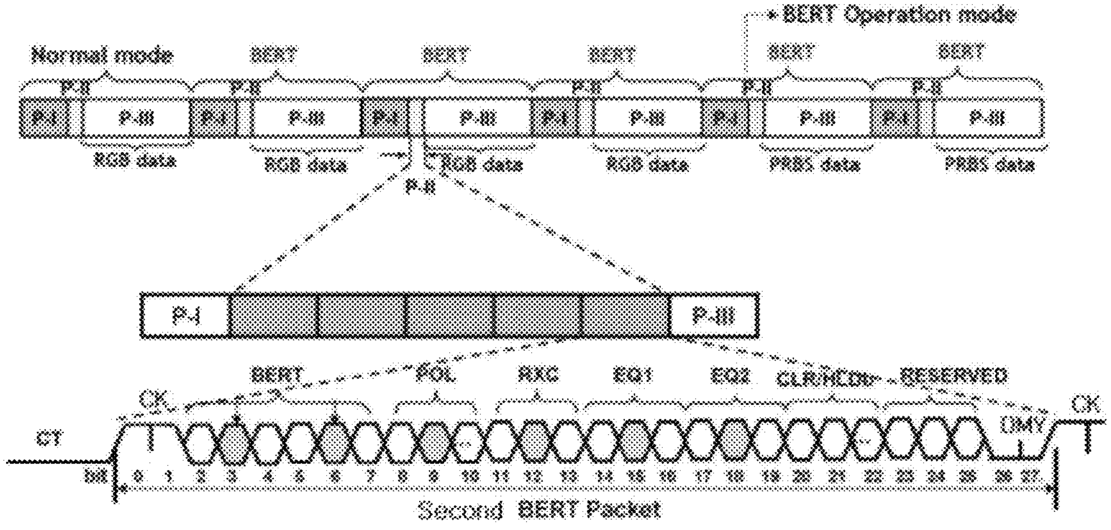

FIGS. 4 and 5 are views explaining the start of the BERT operation mode in the data transmission method between a timing controller and a source driver, to which the BERT function is added according to an embodiment of the present invention.

Referring to FIGS. 4 and 5, the start of the BERT operation mode according to an embodiment of the present invention is to change and transmit the logic states of control start packet and data start packet, which are transmitted in step II, by first and second BERT packets in a normal mode, in which: step I (P-I) of performing a clock training; step II (P-II) of transmitting the control start packet "CTR_START packet", control packets "CTR1 packet" and "CTR2 packet", and the data start packet "DATA_START packet"; and step III (P-III) of transmitting a data packet are included as one cycle.

Preferably, the logic states of the control start bits of the control start packet and the data start bits of the data start packet are changed. For example, the logic state of the control start bits may be changed to "LLLLLL", and the logic state of the data start bits may be changed to "LLLHHH".

In addition, a part of the reserved bits (i.e. $8^{th}$ to $25^{th}$ bits) of the control start packet are utilized as reset bits "DSRET BIT", which accords a pseudo random binary sequence to be transmitted by the timing controller with a bit stream set in the source driver, and as enable bits "DSEN BIT" for determining the transmission of the pseudo random binary sequence.

Similarly, a part of reserved bits (i.e. $8^{th}$ to $25^{th}$ bits) of the data start packet are utilized as bits "POL", "RXC", "EQ1", "EQ2", and "CLR/HLDb" for setting the configuration of the source driver, instead of a control packet disregarded by the first BERT packet.

According to an embodiment of the present invention, when the first and second BERT packets are consecutively repeated at least three times, a mode is shifted into the BERT operation mode, a transmission is performed. In the BERT operation mode, the control packet of step II (P-II) is disregarded by the first BERT packet, and a PRBS pattern instead of the data packet of step III (P-III) is transmitted by the second BERT packet.

Also, in the BERT operation mode, a step of sensing a bit error rate by comparing the bit stream set in the source driver with the PRBS pattern to be transmitted by the timing controller, and a step of presenting the sensed bit error rate on a display panel may be further included.

Figure 6:
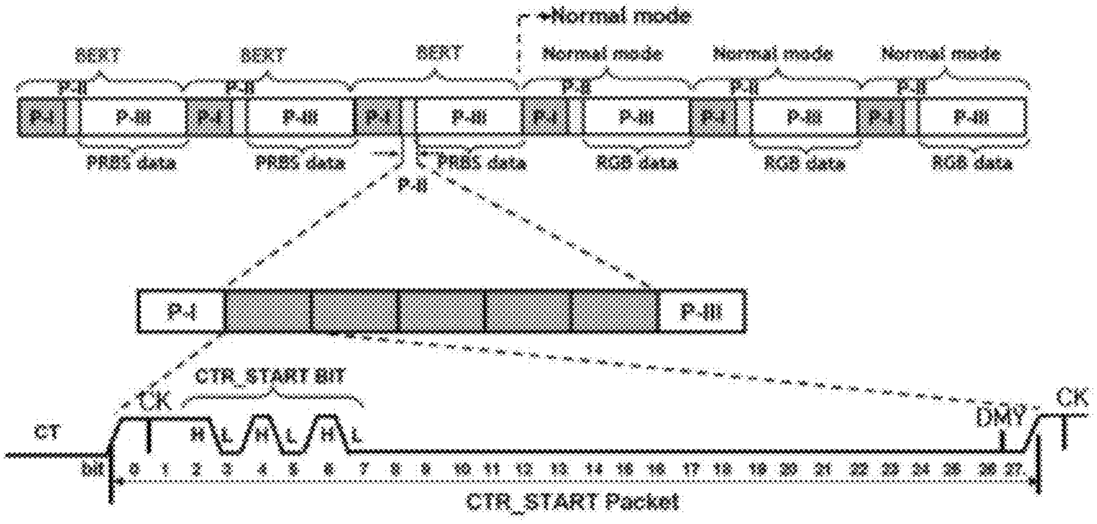
FIGS. 6 and 7 are views explaining the termination of the BERT operation mode in the data transmission method between a timing controller and a source driver, to which the BERT function is added according to an embodiment of the present invention.
Figure 7:
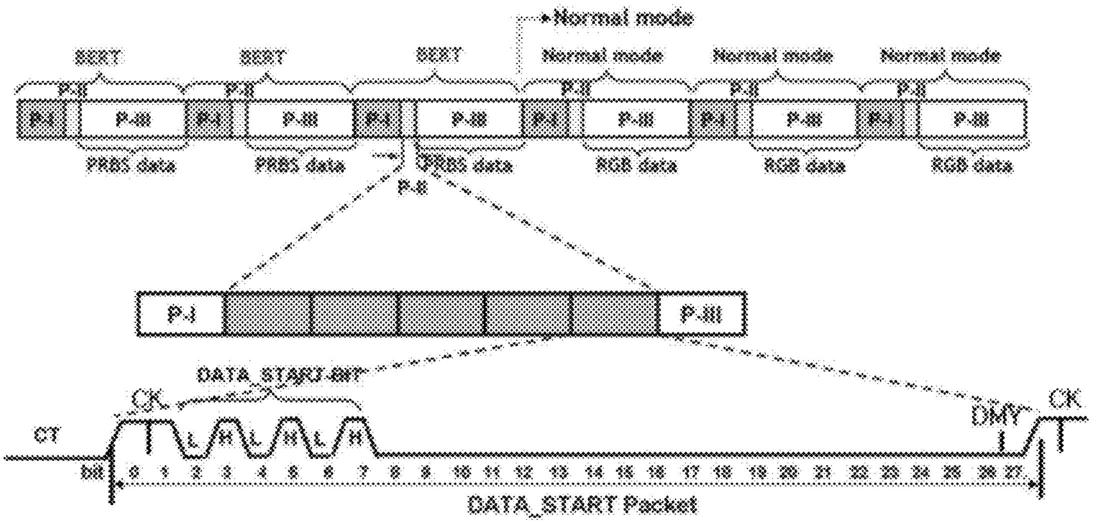

FIGS. 6 and 7 are views explaining the termination of the BERT operation mode in the data transmission method between a timing controller and a source driver, to which the BERT function is added according to an embodiment of the present invention.

Referring to FIGS. 6 and 7, the termination of the BERT operation mode according to an embodiment of the present invention is to return the logic states of first and second BERT packets to those of the normal mode in the BERT operation mode, in which: step I (P-I) of performing a clock training; step II (P-II) of transmitting first and second BERT packets; and step III (P-III) of transmitting a PRBS pattern are included as one cycle. As a result, from the next cycle, a control packet is again recognized by a control start packet, pixel data (RGB data) instead of a PRBS pattern is transmitted by a data start packet.

Preferably, the logic states of the first BERT bits of the first BERT packet and the second BERT bits of the second BERT packet are changed. For example, the logic state of the first BERT bits may be changed to "HLHLHL", and the logic state of the second BERT bits may be changed to "LHLHLH".

Figure 8:
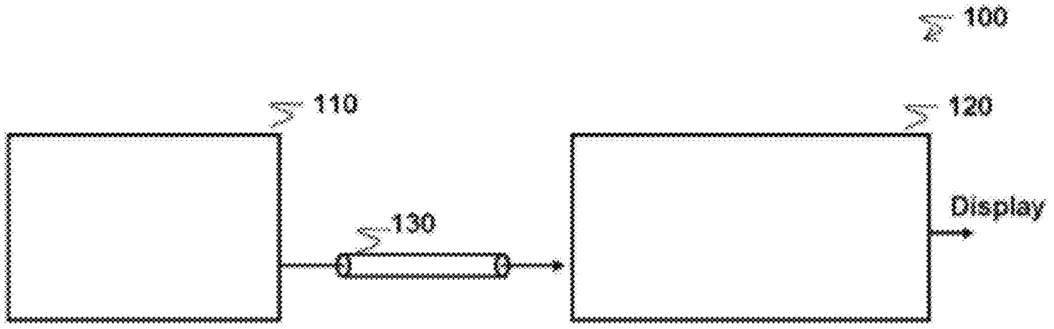
FIG. 8 is a view explaining an apparatus for transmitting data between a timing controller and a source driver, to which the BERT function is added according to an embodiment of the present invention.

FIG. 8 is a view explaining an apparatus for transmitting data between a timing controller and a source driver, to which the BERT function is added according to an embodiment of the present invention.

Referring to FIG. 8, the apparatus 100 for transmitting data between a timing controller and a source driver, to which the BERT function is added according to an embodiment of the present invention, includes a timing controller 110, a source driver 120, and a data signal transmission line 130.

The apparatus 100 for transmitting data between a timing controller and a source driver according to an embodiment of the present invention additionally has the BERT function for sensing the error rate of a signal transmission line.

To this end, the timing controller 110 according to an embodiment of the present invention can not only receive and transmit a data signal, a clock signal, and so on, which is inputted from an exterior, but also transmit a PRBS pattern for determining whether or not an error exists in the data signal transmission line.

In addition, the source driver receives the PRBS pattern as well as the data signal, and compares the PRBS pattern with a bit stream set therein to sense an error rate. In addition, the sensed error rate can be presented on a display panel in real time. It is preferable for the data signal transmission line 130 to be connected in a point-to-point scheme, but it goes without saying that the present invention is not limited thereto.

Figure 9:
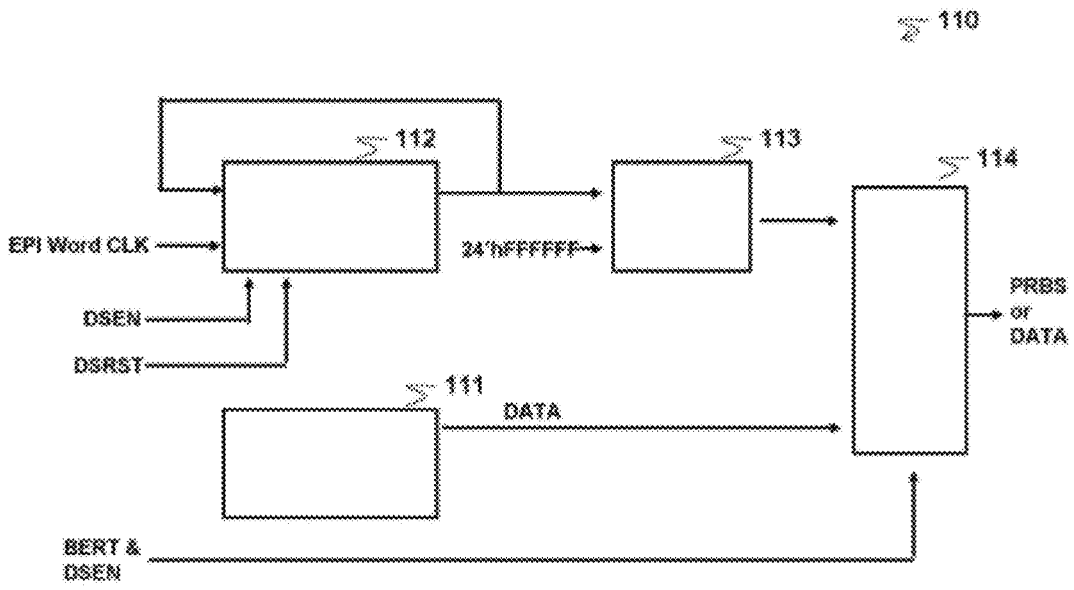
FIG. 9 is a view illustrating a detailed configuration of a timing controller in an apparatus for transmitting data between the timing controller and a source driver, to which the BERT function is added according to an embodiment of the present invention.

FIG. 9 is a view illustrating a detailed configuration of a timing controller in an apparatus for transmitting data between the timing controller and a source driver, to which the BERT function is added according to an embodiment of the present invention.

Referring to FIG. 9, the timing controller 110 according to an embodiment of the present invention includes a data processing unit 111, a first linear feedback shift register (hereinafter, referred to as "LFSR") 112, a first XOR gate 123, and a MUX 124.

The data processing unit 111 processes and outputs a data signal inputted from an exterior, the first LFSR 112 outputs a first bit stream, and the first XOR gate 123 outputs a PRBS pattern by performing an XOR operation between the first bit stream and a bit stream in which all the bits have a value of 1. Finally, the MUX 124 selects and outputs one of the PRBS pattern and the data signal to the data signal transmission line Here, the LFSR is a kind of shift register, has a structure in which a value inputted to the register is calculated by a linear function of previous state values. The technologies on the LFSR are widely known and utilized in digital communication and signal processing fields before the present application is filed, so a detailed description of the operation thereof.

According to an embodiment of the present invention, the LFSR outputs a bit stream constituted by 24 bits when a liquid crystal display device operates in an 8-bit color mode, wherein a characteristic polynomial is expressed as Equation 1 below.

$$X^{24}+X^{9}+X^{5}+X^{2}+1 \quad (1)$$

In addition, according to an embodiment of the present invention, the LFSR responds with an equal size to an embeded clock signal "EPI Word CLK" between data signals, wherein the LFSR outputs the first bit stream when receiving an enable signal "DSEN", and outputs a bit stream in which all the bits have a value of 1 when receiving a reset signal "DSRST". The LFSR is just an exemplary embodiment of the present invention, and it is apparent that those skilled in the art may make various changes and modifications thereto without departing from the scope of the present invention.

Figure 10:
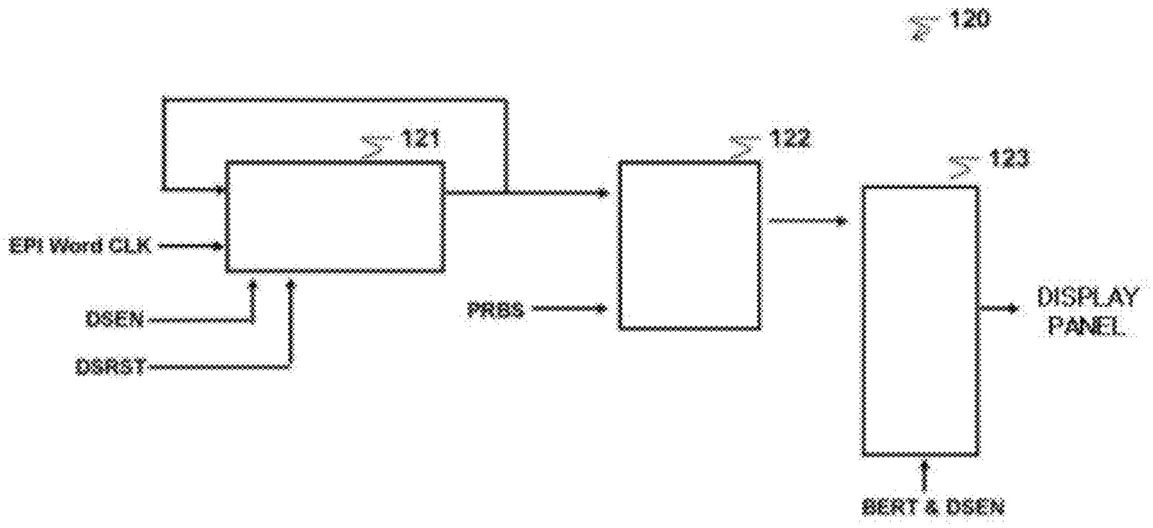
FIG. 10 is a view illustrating a detailed configuration of a source driver in an apparatus for transmitting data between the timing controller and the source driver, to which the BERT function is added according to an embodiment of the present invention.

FIG. 10 is a view illustrating a detailed configuration of a source driver in an apparatus for transmitting data between the timing controller and the source driver, to which the BERT function is added according to an embodiment of the present invention.

Referring to FIG. 10, a source driver 120 according to an embodiment of the present invention includes a second LFSR 121 and a second XOR gate 122. Here, the source driver 120 may further include an error counter 123 for comparing a PRBS pattern transmitted from the timing controller 110 with a bit stream set in the source driver 120, and performing a counting operation when a bit error is sensed. In addition, the present invention may be implemented in such a manner as to present the output of the error counter on a display panel so as to identify the error rate of the data signal transmission line in real time.

According to an embodiment of the present invention, the second LFSR 121 outputs a second bit stream, and the second XOR gate 122 outputs the result of an XOR operation between the second bit stream and the PRBS pattern transmitted from the timing controller 110. Preferably, the second LFSR 121 outputs the same bit stream as the first LFSR 112, and the characteristic equation of the second LFSR 121 is also the same as that of the first LFSR 112.

In addition, the error counter 123 sets a predetermined rule between a PRBS pattern to be transmitted and the second bit stream, and then performs a counting operation when the predetermined rule is not kept between the transmitted pseudo random binary sequence and the second bit stream.

Here, the PRBS pattern may be a first bit by the first LFSR 112, but the PRBS pattern according to an embodiment of the present invention is generated through an XOR operation with a bit stream in which 24 bits all have a value of 1 by the first XOR gate 113. Accordingly, the second bit stream of the second LFSR 121 has a form all bits of which are reversed from those of the PRBS pattern. Therefore, when there is no bit error in the data signal transmission line 130, the second XOR gate 122 outputs a bit stream all bits of which have a value of 1. This is just an exemplary embodiment of the present invention, and those skilled in the art may make various changes in form and details without departing from the scope of the technical aspects of the invention.

As is apparent from the above description, the present invention provides a method and apparatus which can sense a bit error rate in real time by comparing, for a few seconds, a bit stream set in a source driver and a pseudo random binary sequence (PRBS) transmitted from a timing controller 110.

In addition, according to the present invention, it is possible to sense, to present, and to identify a bit error rate in real time using the existing transmission protocol and data format between a timing controller and a source driver without any changes.

Although a preferred embodiment of the present invention has been described for illustrative purposes, those skilled in the art will appreciate that various modifications, additions and substitutions are possible, without departing from the scope and the spirit of the invention as disclosed in the accompanying claims.

What is claimed is:

1. A method for transmitting data between a timing controller and a source driver, the method having a bit error rate test (BERT) function, the method comprising the steps of:

(a) transmitting in a normal mode, wherein a clock training step of synchronizing clocks between the timing controller and the source driver, a step of sequentially transmitting a control start packet CTR_START, control packets CTR1 and CTR2, and a data start packet DATA_START for configuration setup of the source driver, and a step of transmitting a data packet RGB DATA are included as one cycle;

(b) transmitting in BERT ready mode, wherein logic states of the control start packet and the data start packet in the normal mode are changed and transmitted by first and second BERT packets;

(c) transmitting in a BERT operation mode, wherein the control packets are disregarded by the first BERT packet in the BERT ready mode, and a pseudo random binary sequence (PRBS) instead of the data packet is transmitted by the second BERT packet; and (d) comparing the PRBS and a bit stream set in the source driver, and sensing a bit error rate, wherein, in the normal mode, the control start packet comprises control start bits indicating that a next packet is a control packet, and remaining reserved bits, and wherein, in the BERT ready mode, the first BERT packet changes a logic state of the control start bits in the control start packet to another logic state, and utilizes a part of the reserved bits as bits for controlling the BERT operation mode.

2. The method according to claim 1, further comprising a step of (e) presenting the bit error rate on a display panel.

3. The method according to claim 1, wherein step (c) of transmitting in the BERT operation mode is performed after step (b) is consecutively repeated one or more times.

4. The method according to claim 1, wherein, in step (d), a predetermined rule is set between the PRBS to be transmitted and the bit stream set in the source driver, and then a bit error rate is sensed according to whether the predetermined rule between a transmitted PRBS and the bit stream is kept.

5. The method according to claim 1, wherein the bits for controlling the BERT operation mode comprise:

reset bits "DSRST BIT" for according the PRBS with the bit stream set in the source driver; and enable bits "DSEN BIT" for determining whether to transmit the PRBS.

6. The method according to claim 5, wherein, when the reset bits are in a first logic state, the PRBS and the bit stream set in the source driver accord with each other.

7. The method according to claim 6, wherein the PRBS is transmitted to the source driver in a next cycle when the enable bits are in a second logic state, and the transmission of the PRBS is held in a next cycle when the enable bits are in a third logic state.

8. A method for transmitting data between a timing controller and a source driver, the method having a bit error rate test (BERT) function, the method comprising the steps of:

(a) transmitting in a normal mode, wherein a clock training step of synchronizing clocks between the timing controller and the source driver, a step of sequentially transmitting a control start packet CTR START, control packets CTR1 and CTR2, and a data start packet DATA START for configuration setup of the source driver, and a step of transmitting a data packet RGB DATA are included as one cycle;

(b) transmitting in a BERT ready mode, wherein logic states of the control start packet and the data start packet in the normal mode are changed and transmitted by first and second BERT packets;

(c) transmitting in a BERT operation mode, wherein the control packets are disregarded by the first BERT packet in the BERT ready mode, and a pseudo random binary sequence (PRBS) instead of the data packet is transmitted by the second BERT packet; and (d) comparing the PRBS and a bit stream set in the source driver, and sensing a bit error rate wherein, in the normal mode, the data start packet comprises data start bits indicating that a next packet is a data packet, and remaining reserved bits, and wherein, in the BERT ready mode, the second BERT packet changes a logic state of the data start bits in the data start packet to another logic state, and utilizes a part of the reserved bits as bits for setting the configuration of the source driver, instead of a control packet disregarded by the first BERT packet.

9. An apparatus for transmitting data between a timing controller and a source driver, the apparatus comprising a bit error rate test (BERT) function, the apparatus comprising:

the timing controller comprising:

a data processing unit configured to process and output a data signal inputted from an exterior;

a first linear feedback shift register (LFSR) configured to output a first bit stream;

a first XOR gate configured to output a pseudo random binary sequence (PRBS) by performing an XOR operation between the first bit stream and a bit stream in which all bits have a value of 1; and a multiplexer (MUX) configured to select and output one of the PRBS and the data signal to a data signal transmission line; and the source driver comprising:

a second LFSR configured to output a second bit stream; and a second XOR gate configured to output a result of an XOR operation between the second bit stream and the PRBS, wherein, in a normal mode, the timing controller is configured to transmit a control start packet and the data signal to the source driver, wherein the control start packet comprises control start bits indicating that a next packet is a control packet, and remaining reserved bits, wherein, in a BERT ready mode, the timing controller is configured to transmit a first BERT packet to the source driver, wherein the first BERT packet changes a logic state of the control start bits in the control start packet to another logic state, and utilizes a part of the reserved bits as bits for controlling a BERT operation mode, and wherein, in the BERT operation mode, the timing controller is configured to transmit the PRBS to the source driver.

10. The apparatus according to claim 9, wherein the first and second LFSRs are configured to output bit streams each of which is constituted by 24 bits.

11. The apparatus according to claim 10, wherein a characteristic polynomial of each of the first and second LFSRs is satisfied by the following equation:

$x^{24}+x^9+x^5+x^2+1$.

12. The apparatus according to claim 9, wherein the first and second LFSRs are configured to output the first and second bit streams, respectively, in response to an enable signal “DSEN”, and to output a bit stream all bits of which have a value of 1 in response to a reset signal “DSRST”.

13. The apparatus according to claim 9, wherein the source driver further comprises:

an error counter configured to perform a counting operation when comparing a PRBS transmitted from the timing controller with a bit stream set in the source driver, and thus configured to sense a bit error.

14. The apparatus according to claim 13, wherein the error counter is configured to set a predetermined rule between a PRBS to be transmitted and the second bit stream, and to perform a counting operation when the predetermined rule is not kept between a transmitted PRBS and the second bit stream.

15. The apparatus according to claim 14, wherein an output value of the error counter is presented on a display panel.

* * * * *